United States Patent [19]

Cemenska

[11] 4,196,170
[45] Apr. 1, 1980

[54] MULTISTAGE CATALYTIC REACTOR HAVING A PRESSURE RESPONSIVE GAS FLOW CONTROL VALVE THEREIN

[75] Inventor: Richard A. Cemenska, Edelstein, Ill.

[73] Assignee: Caterpillar Tractor Co., Peoria, Ill.

[21] Appl. No.: 909,752

[22] Filed: May 26, 1978

[51] Int. Cl.² .......................... B01J 8/02; B01J 8/04; F01N 3/15

[52] U.S. Cl. .................... 422/171; 422/172; 422/176; 422/181; 60/291; 60/292; 60/299; 60/301

[58] Field of Search ............... 422/171, 172, 181, 176; 60/288, 291, 292, 299–302

[56] References Cited

U.S. PATENT DOCUMENTS

| 3,034,290 | 5/1962 | Gary | 60/291 |
|---|---|---|---|
| 3,295,313 | 1/1967 | Lentz et al. | 60/288 |
| 3,599,427 | 8/1971 | Jones et al. | 422/172 |
| 3,811,845 | 5/1974 | Nakamura | 422/181 |
| 3,820,328 | 6/1974 | Garcea | 60/288 |
| 3,824,788 | 7/1974 | Cole et al. | 422/171 |
| 3,968,645 | 7/1976 | Noguchi et al. | 60/288 |
| 3,981,145 | 9/1976 | Noguchi et al. | 60/288 |
| 3,996,016 | 12/1976 | Wagner | 422/181 |

FOREIGN PATENT DOCUMENTS 411377  6/1934  United Kingdom ............... 60/288

Primary Examiner—Bradley R. Garris
Attorney, Agent, or Firm—Charles E. Lanchantin, Jr.

[57] ABSTRACT

A multistage catalytic reactor for purifying exhaust gas has a passage for communicating exhaust gas to first and second catalyst bed assemblies, and a valve for automatically maintaining flow of the gas solely through the first catalyst bed assembly in response to a first operating condition and for automatically passing the gas through the first and second catalyst bed assemblies in response to a second operating condition, shifting of said valve being free of external control.

9 Claims, 3 Drawing Figures

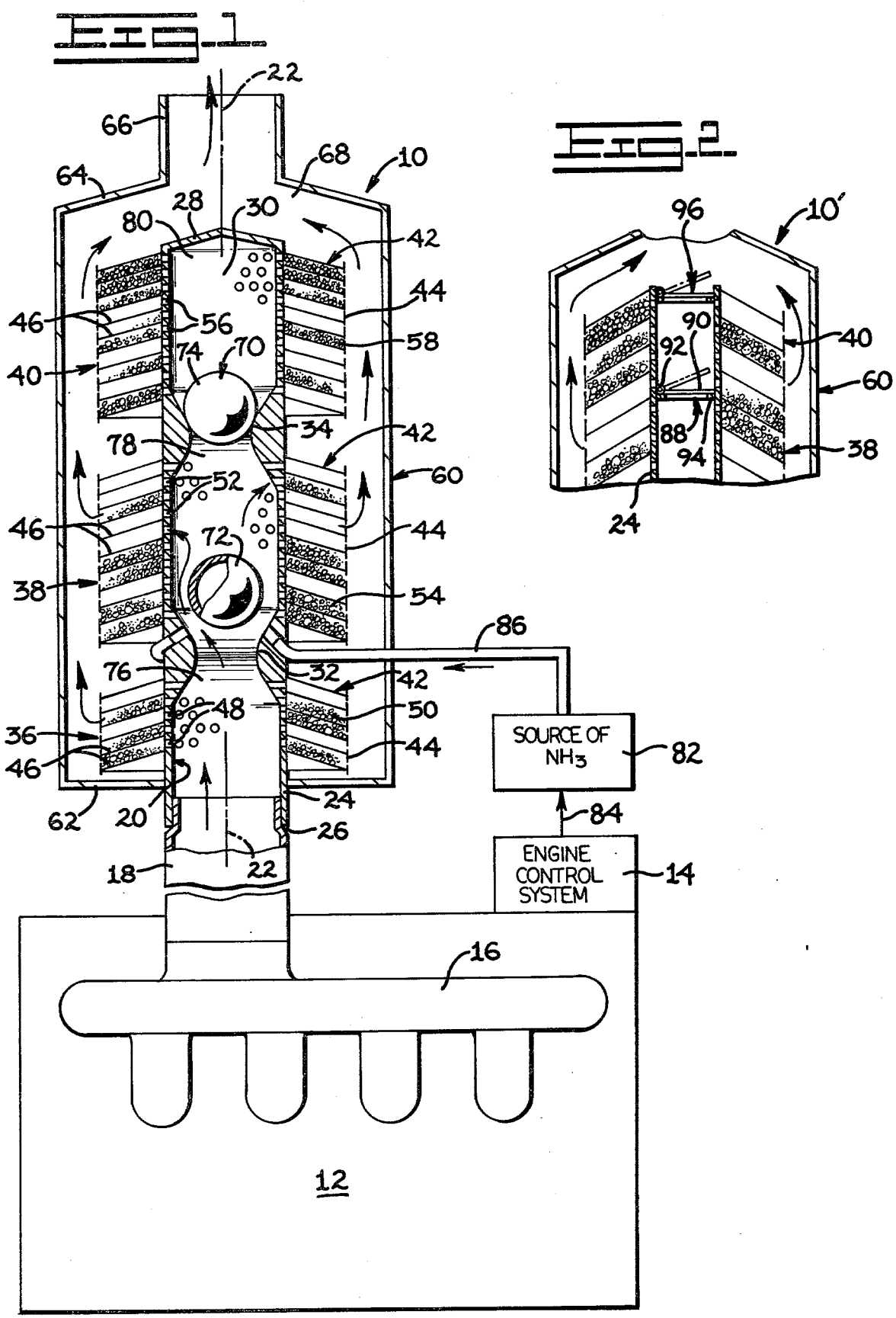

MULTISTAGE CATALYTIC REACTOR HAVING A PRESSURE RESPONSIVE GAS FLOW CONTROL VALVE THEREIN

BACKGROUND OF THE INVENTION

This invention relates generally to a multistage catalytic reactor, and more particularly to multistage catalytic reactor having at least two catalytic bed assemblies and a valve for automatically effecting controlled flow therethrough.

Noxious elements in engine exhaust emissions are currently being at least partially removed by passing the fumes through a thermal catalytic reactor or converter. These reactors contain a bed of particulate material which will chemically react with the fumes and convert the exhaust gases to a more inocuous form whose presence in the atmosphere is less objectionable. The noxious elements usually include, for example, carbon monoxide, nitric oxide and hydrocarbons.

The usual system for purifying an exhaust gas emanating from an internal combustion engine includes a housing having a chamber filled with catalytic material. The exhaust gas passes through perforated walls or screens into the filled chamber and is discharged therefrom into an exhaust pipe in a chemically modified and more acceptable form. Recently, emphasis has been directed to primarily reducing the oxides of nitrogen in the exhaust gases, while also diminishing the amounts of carbon monoxide and hydrocarbons. Unfortunately, during operation of the engine the amount of nitric oxide in the exhaust gases as well as other constituents varies with the load and other operating parameters of the engine. Also, the overall effectiveness of the catalytic reactor varies with temperature changes of the catalytic material for example. To solve these problems, complex systems have been developed to controllably modify the purification of the exhaust as a function of the temperature of the catalytic material, the engine speed or the load by utilizing dampers, by-pass valves and the like. These complex systems are not only expensive, but the control actuated valves must operate in the very hostile environment of the hot exhaust gas.

Another attempted solution to the aforementioned problems is to utilize two different catalyst beds in series and, again, a relatively sophisticated control system therefor. While the first catalyst bed may be adjacent the engine exhaust manifold so that it can operate at a relatively high temperature, the second catalyst bed may be located a greater distance from the exhaust manifold where it can operate at a lower temperature. A relatively small quantity of ammonia may be controllably added to the somewhat purified exhaust and passed through the second catalyst bed to aid in the reduction of the nitric oxides from the gas. Sometimes additional clean air is supplied to the beds to promote the reaction.

The amount of ammonia required to promote the reduction of nitric oxides varies as a function of several engine operating parameters. When the catalyst bed is cold or at low engine loads the amount of nitric oxides in the gas is relatively low and, accordingly, there is little justification to add ammonia to the exhaust stream because it is not required and it passes to the exhaust stream. But, during these conditions, the gas leaches away the previously absorbed ammonium component ($NH_3$) from the surfaces of the individual particles of the catalyst bed. Thus, when the engine is instantaneously heavily loaded and the ammonia is again injected into the exhaust stream there is little adsorbed ammonium available within the reactor and the catalytic reactor is relatively ineffective to convert the nitric oxides to less harmful materials.

Zeolite, for example, has been used as a catalyst. But this pelletized material becomes easily pulverized unless it is tightly contained as by spring-loaded screens, or alternately is built into a form which does not become fluidized or air-borne as by gas flowing upward through the bed. For example, the zeolite material can be made into tubes, honeycombs, etc. at considerable expense. Spring loading the screens doesn't function well because of the harsh environment in which the springs are situated.

SUMMARY OF THE INVENTION

The present invention is directed to overcoming one or more of the problems as set forth above.

According to the present invention, this is accomplished by providing a multistage catalytic reactor having a passage for communicating a gas to first and second catalyst bed assemblies, and valve means for automatically maintaining flow of the gas solely through the first catalyst bed assembly in response to a first operating condition and for passing the gas through both of the catalyst bed assemblies in response to a second operating condition independent and free of external control of the valve means.

Preferably, the valve is located between the first and second catalyst bed assemblies, is gravity operated, and is movable between open and closed positions by the pressure differential substantially across the first catalyst bed assembly.

DESCRIPTION OF THE DRAWINGS

FIG. 1 is a diagrammatic, elevational and sectional view of the multistage catalytic reactor of one embodiment of the present invention in operative association with an engine having exhaust ducting, and with an apparatus for controllably adding ammonia to the exhaust ducting.

FIG. 2 is a fragmentary diagrammatic, elevational and sectional view of the multistage catalytic reactor of a second embodiment of the present invention.

DETAILED DESCRIPTION

Figure 3:
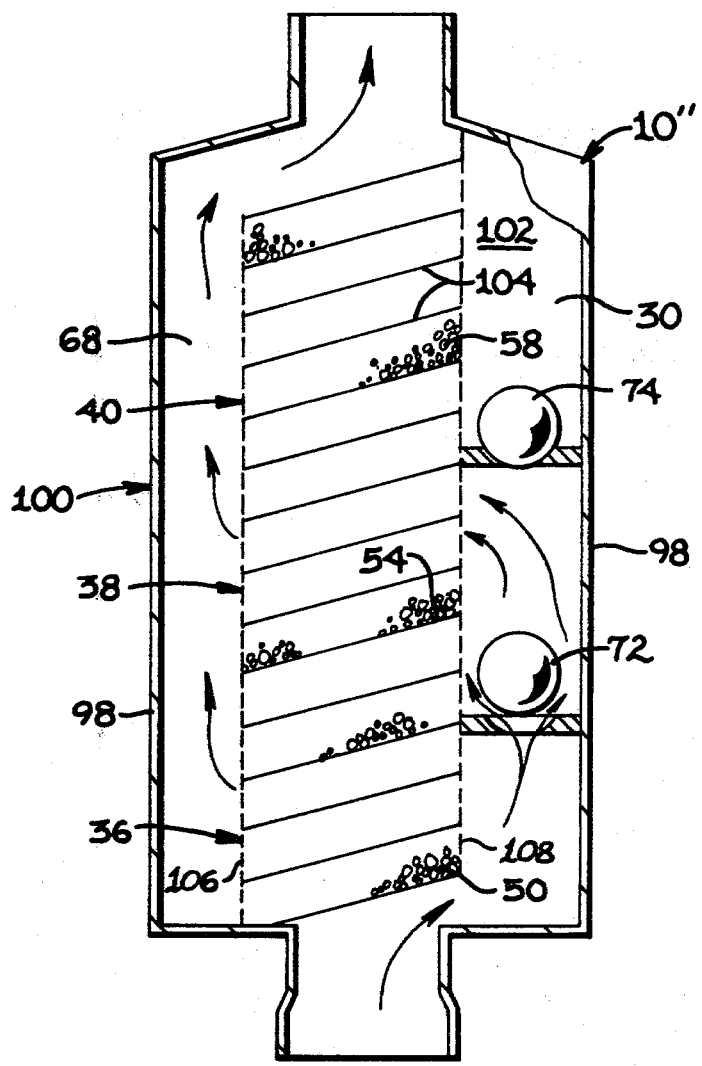
FIG. 3 is a diagrammatic, elevational and sectional view of the multistage catalytic reactor of a third embodiment of the present invention.

In the embodiment illustrated in FIG. 1, a relatively tall, three stage catalytic reactor 10 is shown, although it will be hereinafter appreciated that two stages are sufficient to enable a complete understanding of the present invention. Such upright construction is especially attractive for truck applications wherein vertical mufflers can be neatly tucked away at the exterior corner of the truck cab, not shown.

The multistage catalytic reactor 10 is utilized for example, in conjunction with an internal combustion engine 12 having an engine control system 14 and an exhaust manifold 16 including an exhaust pipe 18. In operation, noxious exhaust emissions from the engine are directed sequentially through the manifold and the exhaust pipe upwardly to the upright multistage catalytic reactor 10, and particularly to an inlet passage means 20 thereof having a substantially vertical central axis 22.

The inlet passage means 20 includes a perforated tubular intake pipe 24 symmetrically arranged on the central axis 22 and mounted on the exhaust pipe 18 as at a sealed joint 26. In the instant example the intake pipe has an enclosing upper end wall 28 so that a central inlet passage or central chamber 30 is defined therein. Moreover, first and second venturi-like check valve seats 32 and 34 are formed within the intake pipe at axially spaced locations.

Advantageously, first, second, and third catalyst bed assemblies 36, 38 and 40 are connected to the intake pipe 24 in a substantially vertical stack. Each one of them is similar in construction from the standpoint that each has wall means 42 for maintaining downward and radially outward flowing movement of exhaust gas from the central chamber 30, and each has a cylindrical outer perforated tubular wall or screen 44 substantially concentric relative to the central axis 22. Preferably, each wall means 42 includes a substantially equally spaced apart plurality of annular flow directors, plates or trays 46 that are of a conical configuration.

Thus, the trays 46 of the first catalyst bed assembly 36 are connected to the intake pipe 24 in aligned relation with a first plurality of passages or inlet ports 48 through the intake pipe so that the exhaust gas can pass radially outwardly through a first particulate catalyst material 50 contained between the trays, the intake pipe, and the perforated wall 44. Likewise, the trays of the second catalyst bed assembly 38 are aligned with a second plurality of passages or inlet ports 52 through the intake pipe so that the exhaust gases may pass through a second particulate catalyst material 54, and the trays of the third catalyst bed assembly 40 are aligned with a third plurality of passages or inlet ports 56 so that the exhaust gases may pass through a third particulate catalyst material 58.

A cylindrical housing 60 having a lower end wall 62, an upper conically tapered end wall 64 and a cylindrical outlet pipe 66 is substantially concentrically connected to the intake pipe 24 to define a peripheral collecting chamber 68 for receiving the exhaust gases after at least a portion of the noxious ingredients had been chemically reduced in at least one of the first, second and third catalyst bed assemblies 36, 38 and 40 respectively.

In accordance with a major aspect of the invention, valve means 70 is provided for automatically maintaining gas flow solely through the first catalyst bed assembly 36 in response to a first operating condition, for effecting gas flow through the first and second catalyst bed assemblies in response to a second operating condition, and for effecting gas flow through all three of the catalyst bed assemblies in a third operating condition.

In the embodiment of FIG. 1, the valve means 70 preferably includes a first check valve or ball 72 and a second check valve or ball 74 which serve to divide the intake pipe 24 into an upstream portion 76, a central portion 78 and a downstream portion 80. Each of the check valves is preferably a sphere of preselected size and weight adapted to rest solely by gravity on the respective check valve seats 32 and 34 which have preselected seating areas. Preferably, the spheres or balls are hollow and metallic, such as hollow stainless steel balls. Each of the balls is urged upwardly to an open condition by the pressure differential acting individually across them.

For example, when a pressure differential below a preselected value, for example about (21 kPa) 3 psi, is experienced between the upstream portion 76 and central portion 78, or substantially across the first catalyst bed assembly 36, then the first check valve 72 remains closed so that exhaust gases flow solely through the first stage of the catalytic reactor 10. However, upon reaching that preselected value the first check valve opens to permit some exhaust gas flow to the central portion 78 of the intake pipe 24. Hence, as the pressure differential and/or flow rate increases across the first check valve in accordance with a second operating condition of the engine 12, a larger amount of exhaust gas is directed through the second catalyst bed assembly 38 forming the second stage since the second check valve 74 remains closed. At a third operating condition of the engine, a condition is reached where the second check valve 74 is also forced open by a second pressure differential between the central portion 78 and downstream portion 80 or substantially across the second catalyst bed assembly 38. This second pressure differential is preferably larger than the pressure differential required to open the first check valve 72. Consequently, with such third operating condition established, the exhaust gases pass through the third catalyst bed assembly 40 forming the third stage of the reactor 10, as well as through the other two stages.

During operation of the engine 12, gases pass upwardly from the exhaust pipe 18 to the upstream portion 76 of the intake pipe 24. At a first operating condition corresponding to a relative low gas flow rate, only the first catalyst bed assembly 36 is used to remove noxious materials from the gas. In such conditions, the gas flows radially outwardly through the ports 48 and is directed downwardly between the trays 46 through the first particulate catalyst material 50. Preferably, such material performs effectively at a relatively low temperature and is particularly suitable for combatting hydrocarbon and carbon monoxide emissions. For example, the first material 50 may be a noble metal catalyst such as platinum or palladium coated alumina, as is known in the art. It is of note that the downward slope of the wall means 42 in each of the stages advantageously promotes a slight packing of the granules of the catalyst material, rather than fluidization, thus minimizing the erosion caused by constant rubbing of the granules as is the case in many other prior art structures.

After a portion of the noxious material in the gases is converted by the thermal reaction of the first catalyst bed assembly 36, the emerging gas travels upwardly in the collecting chamber 68 around the internal periphery of the housing 60. As the gas proceeds it preheats the second and third catalyst bed assemblies 38, 40 and conditions them to perform more effectively when the flow rate from the engine 12 increases.

At an intermediate flow rate of the gases corresponding to a second operating condition of the engine 12, the first check valve 72 is unseated and both the first and second catalyst bed assemblies 36, 38 receive the gases and remove or chemically modify the deleterious portions of the gases. The second catalyst material 54 is preferably different than the first catalyst material 50 so that it will be more effective, for example, in reducing nitric oxides in the gases. Moreover, a pressurized source of ammonia ($NH_3$), as indicated by the reference numeral 82, is preferably actuated or opened at this point by signal means 84 from the engine control system 14 to supply ammonia to a conduit 86 leading to the intake pipe 24 downstream of the first catalyst bed assembly 36 in order to minimize wastage of ammonia through the first catalyst material 50. Hence, the ammonia is profitably utilized and the amount used is preferably increased by the signal means 84 in proportion to the increasing gas flow rate. The supplemental ammonia reacts with the second catalyst material 54, which may be zeolite of the hydrogen exchanged mordanite type, for example. Such zeolite catalyst material and thermal catalytic reaction is known in the art.

With still a further increase in the flow rate of the exhaust gas into the intake pipe 24 corresponding to a relatively high flow rate and third operating condition of the engine 12, the second check valve 74 is opened to permit all three of the catalyst bed assemblies 36, 38 and 40 to effectively remove or transform nocuous material in the gas. Supplemental ammonia is fed to the intake pipe from the source 82 at a higher rate than in the second operating condition described immediately above, and the first and second stages perform substantially the same only processing an additional volume of the exhaust gas, and normally at a somewhat higher temperature.

Preferably, the third catalyst material 58 is different than either the first or second catalyst materials 50 and 54, so that it will be more effective under the specific operating conditions of the engine 12. For example, the third catalyst material 58 may be thermally reacting with the exhaust gases at an average temperature below the average operating temperature of the second catalyst material 54. Accordingly, the third catalyst material may be vanadium pentoxide on alumina which is believed to perform better at somewhat lower temperatures than the aforementioned zeolite material. The latter catalyst material provides an ammonium-vanadia type of thermal catalytic reaction, which reaction is also generally known in the art.

Another feature of the subject reactor 10 is that it acts much like a classical absorption type of muffler, as opposed to a reactive muffler. Its effectiveness as a muffler depends upon the physical characteristics of the granules of the catalyst materials 50, 54 and 58, the volume thereof, the absorption characteristics of the various surfaces of the reactor, etc.

Another reactor 10' embodiment is illustrated in FIG. 2, with elements substantially the same as the previously described embodiment bearing identical reference numerals. In this example, however, a representative check valve 88 between the second and third catalyst bed assemblies 38 and 40 is shown which is modified in construction from the check valves 72 and 74 shown in FIG. 1. Particularly, the check valve 88 has a round, flat valve element 90 pivotally connected to the internal surface of the intake pipe 24 as at a pivot joint 92. The valve element 90 is urged upwardly when viewing the drawing from the closed solid line position to the phantom line position by the differential pressure acting across it.

Furthermore, rather than having an end wall 28 at the upper end of the intake pipe 24 as shown in FIG. 1, the second embodiment reactor 10' has a by-pass valve 96. Although by-pass valve 96 may be similar in construction to the check valve 88 immediately below it, it could be constructed to open at a higher pressure differential than the check valves 88 between the other stages. Under certain predetermined operating conditions the by-pass valve 96 opens to permit a relatively small portion of the exhaust gases in the intake pipe 24 to by-pass entirely any of the catalyst bed assemblies 36, 38 and 40.

Another reactor 10'' embodiment is illustrated in FIG. 3. In reactor 10'' the inlet passage 30 and the collecting chamber or outlet passage 68 are juxtaposed to a pair of opposite end walls 98 of an upright housing 100 having a substantially rectangular cross section in a horizontal plane. Another pair of opposite side walls 102 serve to confine passage of gas from the inlet passage 30 to the outlet passage 68 between a plurality of inclined and substantially rectangular flow directors or trays 104. Thus, gas flow is advantageously maintained in a downwardly flowing manner through at least one of the first, second and third catalyst bed assemblies 36, 38, and 40 respectively spanning between the side walls 102. Moreover, the flow paths through the respective catalyst materials 50, 54 and 58 and a pair of rectangular perforated walls or material containment screens 106, 108 spanning between the side walls are desirably longer and the pressure drop greater for the same density level of the catalyst materials as in reactor 10. Consequently, the rectangular construction of the catalyst bed assemblies in the reactor 10'' can provide an increased overall effectiveness for removing noxious elements when compared with the cylindrical construction of the catalyst bed assemblies in the reactor 10.

While the invention has been described and shown with particular reference to three embodiments, it is contemplated that a lightweight, coiled compression spring could be utilized to bias each of the balls 72, 74 downwardly in FIGS. 1 and 3, although not shown, to assure more positive operation thereof. Furthermore, a relatively lightweight torsion spring, not shown, could also be utilized at each of the pivot joints 92 in FIG. 2, to more positively urge the valve elements 90 downwardly toward a gas blocking position against their respective valve seats 94.

Other aspects, objects and advantages will become apparent from a study of the specification, drawings and appended claims.

What is claimed is:

1. In a multistage catalytic reactor (10) for purifying exhaust gas having first and second catalyst bed assemblies (36, 38) and an inlet passage (30) for communicating exhaust gas to the catalyst bed assemblies (36, 38), the improvement comprising:
   valve means (70/88) for automatically maintaining gas flow solely through the first catalyst bed assembly (36) in response to a pressure differential substantially across the first catalyst bed assembly (36) by remaining in a closed position, said pressure differential being below a preselected value, and for moving to an open position and establishing gas flow through the first and second catalyst bed assemblies (36, 38) in response to a pressure differential of at least said preselected value, said valve means (70/88) being located in said inlet passage (30) between the first and second catalyst bed assemblies (36, 38).

2. The reactor (10) of claim 1 wherein said valve means (88) includes a valve element (90) pivotally connected to said reactor (10) intermediate the ends of said inlet passage (30), said valve element (90) being urged toward the closed position by gravity.

3. The reactor (10) of claim 1 wherein said valve means (70/88) divides said inlet passage (30) into an upstream portion (76) and a downstream portion (78), said first catalyst bed assembly (36) is located at said upstream portion (76) and has first catalyst material means (50) and said second catalyst bed assembly (38) is located at said downstream portion (78) and has second catalyst material means (54) different than said first catalyst material means (50).

4. The reactor (10) of claim 1 including a housing (100) having a plurality of exterior walls (98,102), said inlet passage (30) being juxtaposed to and partially defined by one of said exterior walls (98,102).

5. The reactor (10) of claim 1 wherein said valve means (70,88) divides said inlet passage (30) into an upstream portion (76) and a downstream portion (78), said upstream portion (76) being blocked from said downstream portion (78) in said closed position of said valve means (70/88) solely in response to gravity action upon said valve means (70/88).

6. The reactor (10) of claim 1 wherein said inlet passage (30) comprises a perforated tube (24) and an annular seat (32/94) is defined within said tube (24) intermediate the ends thereof, and said valve means (70/88) includes a movable member (72/90) urged toward said seat (32/94) by gravity.

7. The reactor (10) of claim 6 wherein said valve means (70) includes a spherical ball (72) resting on said annular seat (32) in the closed position of said valve means (70).

8. A multistage catalytic reactor (10) for purifying exhaust gas comprising:
   first and second catalyst bed assemblies (36,38);
   element means (24/98,102) defining an inlet passage (30) in communication with said catalyst bed assemblies (36,38),
   valve means (72,32) located in said inlet passage (30) for maintaining gas flow solely through the first catalyst bed assembly (36) by remaining in a closed position, establishing gas flow through both the first and second catalyst bed assemblies (36,38) by moving to an open position, and being responsive solely to gravity and to a pressure differential substantially across the first catalyst bed assembly (36) for automatically opening when said pressure differential is at or above a preselected value and closing when said pressure differential is below said preselected value.

9. The reactor (10) of claim 8 wherein said element means (24/98,102) includes a perforated tubular member (24) and said valve means (72,32) includes a valve seat (32) and a valve (72) defining an upstream portion (76) and a downstream portion (78) within the tubular member (24).

* * * * *